United States Patent [19]
Suzuki et al.

[11] Patent Number: 5,503,952
[45] Date of Patent: Apr. 2, 1996

[54] METHOD FOR MANUFACTURE OF COLOR FILTER AND LIQUID CRYSTAL DISPLAY

[75] Inventors: Tameyuki Suzuki, Zushi; Akira Kubo, Kobe; Yoshikatsu Okada, Chiba, all of Japan

[73] Assignee: Shinto Paint Co., Ltd., Amagasaki, Japan

[21] Appl. No.: 404,741

[22] Filed: Mar. 15, 1995

[30] Foreign Application Priority Data

Mar. 22, 1994 [JP] Japan ................. 6-076634
Jun. 27, 1994 [JP] Japan ................. 6-168798
Dec. 28, 1994 [JP] Japan ................. 6-339092

[51] Int. Cl.$^6$ .................................. G03F 9/00
[52] U.S. Cl. ................. 430/7; 430/311; 430/321
[58] Field of Search ................. 430/7, 311, 321

[56] References Cited

U.S. PATENT DOCUMENTS

| | | | |
|---|---|---|---|
| 4,311,773 | 1/1982 | Kaneko et al. | 430/7 |
| 4,617,094 | 10/1986 | Kamamori et al. | 204/18.1 |
| 4,812,387 | 3/1989 | Suzuki et al. | 430/311 |
| 4,873,175 | 10/1989 | Suzuki et al. | 430/311 |
| 4,902,592 | 2/1990 | Matsumura et al. | 430/7 |
| 4,948,706 | 2/1992 | Sugihara et al. | 430/311 |
| 5,418,094 | 5/1995 | Sato | 430/7 |
| 5,439,582 | 8/1995 | Oka et al. | 430/7 |

FOREIGN PATENT DOCUMENTS

| | | |
|---|---|---|
| 0472210 | 2/1992 | European Pat. Off. |
| 6-130379 | 5/1994 | Japan |

*Primary Examiner*—S. Rosasco
*Attorney, Agent, or Firm*—Stevens, Davis, Miller & Mosher

[57] ABSTRACT

A color filter having discrete color layers arrayed on a substrate and light screening coating films interlaced between the color layers and if desired seal part having no coating film thereon, with high precision is industrially advantageously manufactured by (a) forming a transparent electroconductive layer on a transparent substrate, (b) coating the transparent electroconductive layer with a positive photoresist composition to form a photoresist layer, (c) exposing the photoresist layer to light through a photomask and developing the light-exposed photoresist layer to form a circuit-form photoresist layer, (d) etching and eliminating the transparent electroconductive layer bared in the gaps between the circuit-form photoresist layer to obtain a substrate having thereon a circuit-form laminate, (e) exposing the laminate to light through a photomask and developing the light-exposed laminate to bare the transparent electroconductive layer discretely, (f) carrying out electrodeposition using a thermosetting or photosensitive resin material-containing electro-deposition bath to form colored layers on the discretely bared transparent electroconductive layers, (g) eliminating the photoresist layer remaining after the development of step (e) to obtain a substrate having discrete color layers, the gaps being bared substrate surface and bared transparent electroconductive layer, (h) coating the substrate with a light screening material-containing photosensitive resin composition to form a light screening resin layer, and (i) exposing the light screening resin layer to light from the back side and developing the substrate to eliminate the unexposed part of the light screening resin layer. The color filter is well prevented from leakage of light and clear in coloration and superior in optical properties. A liquid crystal display of high image quality is manufactured by the use of this color filter.

10 Claims, 4 Drawing Sheets

METHOD FOR MANUFACTURE OF COLOR FILTER AND LIQUID CRYSTAL DISPLAY

The present invention relates to a method for manufacturing a color filter and a liquid crystal display. More particularly, the invention relates to a novel method for manufacturing a color filter having discrete color layers arrayed on a substrate and light screening coating films interlaced between the color layers, and a method for manufacturing a liquid crystal display using said color filter.

Liquid crystal displays (LCD) have so far been used in the so-called pocket-sized television and the like. However, the size of liquid crystal displays has rapidly been enlarged in recent years. The image quality of liquid crystal displays has also been improved by the development from TN liquid crystals to STN liquid crystals and active driving elements exemplified by TFT, which has enabled commercialization of goods with a liquid crystal display having as high image quality as cathode-ray tubes.

Various studies have been conducted for improving image quality and productivity of a color filter used in liquid crystal displays. Of these studies, the method for forming light screening coating films called black matrices formed at the regions not occupied with color layers such as red, green, and blue layers is of great concern.

Particularly in the TFT type color LCD which is considered most promising, it is demanded to improve light screening capability of the light screening coating films and to give a lattice pattern to the light screening coating films to be interlaced between the color layers.

As the method for forming light screening coating films at the regions not occupied with color layers, there are known methods utilizing printing techniques such as silk screening method, offset method and the like.

Further, there is also known a method for forming light screening coating films at regions not occupied with stripe-form color layers, which comprises providing stripe-form electroconductive circuits insulated from one another on a substrate, forming color layers by electrodeposition on the circuits, subsequently coating the whole surface of the substrate with a photosensitive resin composition capable of giving light-screening coating film, exposing the resulting coating film to light emitted from the back side of substrate by using the color layers as a photomask, and removing the light-unexposed portion of the coating film by development (U.S. Pat. No. 4,812,387).

The printing methods mentioned above, however, are disadvantageous in that the stripe distance is as long as about 100 μm or more, and light screening coating films can hardly be obtained in a lattice form with high precision.

Further, according to the method described in U.S. Pat. No. 4,812,387, color layers can be formed in finer pattern with higher precision, as compared with the printing methods, but it is difficult to form discrete color layers.

LCD is usually manufactured by placing a first plate product composed of, for example, a color filter comprising a substrate having color layers thereon and light-screening coating films interlaced between the color layers, a polarizing plate and a transparent electrode and a second plate product composed of, for example, a polarizing plate and a counter transparent electrode to be confronted each other at a prescribed distance, sealing the circumference of the two plate products with a sealing material, and sealing up a liquid crystal into the gap between the two plate products. Hereinafter, the term "seal part" refers to blank margin areas on a surface of a substrate, at which areas the first plate product is attached to the second plate product. The seal part is usually at the peripheral edges on the surface of a substrate which surface faces inward when the first plate product is attached to the second plate product.

For manufacturing a color filter to be used in such LCD by electrodeposition, there are also known methods as disclosed in, for example, JP-A-59-90818 and JP-A-59-114572. Further, JP-A-63-240503 discloses a method for manufacturing a color filter by electro-deposition, which comprises feeding current to predetermined electroconductive circuits of those formed on a substrate with use of a specific feeder, so that color layers such as red, green and blue are formed by turns on the circuits fed.

However, in the manufacture of LCD using such color filters, an incidental presence of color layers at the area to be sealed with a sealing material would cause defective sealing which results in serious troubles such as leakage of liquid crystal, etc. In order to avoid such troubles, it is conventional to take appropriate measures for preventing the formation of color layers in the area to be sealed, e.g., application of an insulating organic coating film or the like in advance to the area to be sealed. Such measures for preventing formation of color layers in the areas to be sealed, however, are quite complicated and causes elevation of manufacturing cost and drop in workability and productivity.

The present inventors conducted extensive studies to solve the problems mentioned above and to manufacture a desired color filter industrially advantageously, and attained to the present invention.

The present invention provides:

a method for manufacturing a color filter having discrete color layers and light screening coating films interlaced between the color layers, which comprises the steps of:

(a) forming a transparent electroconductive layer on a transparent substrate, (b) coating the transparent electroconductive layer formed in step (a) with a positive photoresist composition to form a photoresist layer, (c) exposing the photoresist layer formed in step (b) to light through a photomask having a prescribed pattern, followed by development to eliminate the light-exposed portion of the photoresist layer, forming the photoresist layer into a circuit form, (d) subjecting the resulting substrate to etching to eliminate the transparent electroconductive layer bared in the gaps of the circuit-form photoresist layer formed in step (c), obtaining a substrate having thereon a circuit-form laminate consisting of the transparent electroconductive layer as an under layer and the photoresist layer as an over layer, (e) subjecting the substrate formed in step (d) to light-exposure through a photomask having a prescribed pattern, followed by development to bare the transparent electroconductive layer constituting the under layer of the laminate discretely, (f) subjecting the resulting substrate to electro-deposition using a thermosetting or photosensitive resin material-containing electrodeposition bath to form color layers on the transparent electroconductive layer discretely bared in step (e), (g) eliminating the photoresist layer remaining after the development in step (e) to obtain a substrate having the discrete color layers, the gaps thereof being the bared substrate surface and the bared transparent electroconductive layer, (h) coating whole surface of the substrate formed in step (g) with a light screening material-containing photosensitive resin composition to form a light screening resin layer, and (i) exposing the light screening resin layer formed in step (h) to light emitted from the side opposite to the light screening resin layer-carrying surface of the substrate, followed by development to eliminate the unexposed portion of the light screening resin layer;

a method according to the above-mentioned method, which comprises the following steps (e'), (g') and (h'):

(e') subjecting the substrate formed in step (d) to light-exposure through a photomask having a prescribed pattern, followed by development to bare the transparent electroconductive layer constituting the under layer of the laminate discretely, while leaving uneliminated the photoresist layer in a seal part, (g') eliminating the photoresist layer remaining after the development of step (e') and, if necessary, the photoresist layer at a seal part to obtain a substrate having the discrete color layers, the gaps thereof being the bared substrate surface and the bared transparent electroconductive layer, (h') coating whole surface of the substrate formed in step (g') excluding the seal part with a light screening material-containing photosensitive resin composition to form a light screening resin layer, in place of steps (e), (g) and (h) in the above mentioned method, respectively, and additionally comprises the following step (j):

(j) eliminating the photoresist layer of the seal part, if leaving uneliminated in steps (g') and (i); and a method for manufacturing a liquid crystal display which comprises using a color filter produced by one of the above-mentioned methods.

In FIG. 1, [I] is the intermediate product formed through step (a), [II] is the intermediate product formed through step (b), [III] is the intermediate product formed through steps (c) and (d), [V] is the intermediate product formed through steps (e) and (f), [VII] is the intermediate product formed through steps (g) and (h), and [VIII] is the color filter formed through step (i) which has discrete color layers and light screening coating films interlaced between the color layers. Here, 11 is a transparent substrate, 12 is a transparent electroconductive layer, 13 is a photoresist layer, 14 is a blue-color layer, 15 is a light screening resin layer, 16 is a red-color layer, and 17 is a green-color layer.

In FIG. 2, [IV] is the intermediate product formed through steps (a), (b), (c), (d) and (e), [VI] is the intermediate product formed through steps (f) and (g), and [VIII] is the color filter formed through steps (h) and (i) which has discrete color layers and light screening coating films interlaced between the color layers. Here, 11 is a transparent substrate, 12 is a transparent electroconductive layer, 13 is a photoresist layer, 14 is a blue-color layer, 15 is a light screening resin layer, 16 is a red-color layer, and 17 is a green-color layer. Although, the red-, green- and blue-color layers in this Figure are arrayed in parallel, respectively, it is well known that the color layers may be arrayed in other forms such as mosaic or triangular form.

In FIG. 3, [I] is the intermediate product formed through step (a), [II] is the intermediate product formed through step (b), [III] is the intermediate product formed through steps (c) and (d), [V] is the intermediate product formed through steps (e') and (f), [VII] is the intermediate product formed through steps (g') and (h'), and [IX] is the color filter formed through step (i) and optional step (j) which has discrete color layers and light screening coating films interlaced between the color layers. Here, 21 is a transparent substrate, 22 is a transparent electro-conductive layer, 23 is a photoresist layer, 25 is a blue-color layer, 26 is a light screening resin layer, 27 is a red-color layer, and 28 is a green-color layer.

In FIG. 4, [IV] is the intermediate product formed through steps (a), (b), (c), (d) and (e'), [VII] is the intermediate product formed through steps (f), (g') and (h), and [IX] is the color filter formed through step (i) and optional step (j) which has discrete color layers and light screening coating films interlaced between the color layers. Here, 21 is a transparent substrate, 22 is a transparent electroconductive layer, 23 is a photoresist layer, 24 is a seal part, 25 is a blue-color layer, 26 is a light screening resin layer, 27 is a red-color layer, and 28 is a green-color layer.

The present invention is explained in more detail.

The transparent substrate which can be used in the present invention include known substrates such as glass plate, plastic plate and the like.

Step (a) of the present invention is a step of forming a transparent electroconductive layer on the whole surface or prescribed region of the above-mentioned substrate. In this step, a transparent electroconductive layer such as ITO film (tin-doped indium oxide film), NESA film (antimony-doped tin oxide film) or the like can be formed on the substrate according to known methods.

Step (b) of the present invention is a step of coating the transparent electroconductive layer formed in step (a) with a positive photoresist composition to form a photoresist layer.

The positive photoresist composition may be any material so far as exposure to light and development permit the dissolution and elimination of the parts exposed to light. Preferable examples thereof include a composition containing novolac type phenolic resin, a quinonediazide type photosensitizer, etc. Commercially available products such as OFPR-800 (Tokyo Ohka Co., Ltd.), PF-7400 (manufactured by Sumitomo Chemical Co., Ltd.), FH-2030 (manufactured by Fuji Hant Electronics Co.) and the like may also be used appropriately.

As occasion demands, a viscosity regulator, an organic solvent, an adhesion improver and other known adjuvants can be incorporated into the positive photoresist composition.

The adoptable coating method includes screen printing method, offset printing method, roll coating method, bar coating method, spin coating method and the like. When a coating film is formed by spin coating method, the viscosity of the positive photoresist composition is preferably lowered by addition of a diluent such as a non-reactive diluent (e.g. ethyl cellosolve acetate). Particularly preferably, 5–40 parts by weight of a diluent is added to 100 parts by weight of the composition. In carrying out the spin coating, it is recommendable to change the whirler in two stages in a manner such that the photoresist composition is spread on a substrate at 100–400 rpm in the first stage, and thickness of the photoresist composition is made even at 800–5,000 rpm in the second stage. By the spin coating method, a coating film can be formed on a transparent conductive layer with high fidelity.

If desired, the photoresist layer thus formed is heat-treated at 60°–100° C. for a period of 5–60 minutes. By the heat treatment, the photoresist composition is preliminarily cured, the adhesion between the coating film and electroconductive layer is strengthened, and the workability of the light exposure step described later is improved.

Step (c) of the present invention is a step of exposing the photoresist layer formed in step (b) to light through a photomask having a prescribed pattern and thereafter developing the light-exposed photoresist layer to form a circuit-form photoresist layer. The development can be carried out by dissolving and eliminating the exposed part of the layer while leaving the unexposed part as an insoluble part.

This step (c) is intended to form the transparent electroconductive layer having been formed on the transparent substrate into a shape of a plurality of transparent electroconductive circuits which are insulated from one another, when combined with step (d) described later. The pattern of the photomask may be appropriately patterned in accordance with desired arrangement of the discrete color layers to be formed, the arrangement such as parallel arrangement, triangular arrangement, mosaic arrangement and the like being well known in the art. The photomask is so patterned that the part of the transparent electroconductive layer to be etched and eliminated in the subsequent step (d) come to light-exposed parts and the residual parts come to unexposed parts.

In carrying out the exposure to light of this step (c), lights of various wavelength ranges can be used depending on the kind of positive photoresist composition used in step (b). Generally speaking, lights of UV region are preferable. As the light source, apparatuses utilizing super-high pressure mercury lamp, metal halide lamp and the like can be used.

The conditions of the exposure vary depending on the light source and positive photoresist composition used. Usually, however, the light exposure is in the range of from 10 to 4,000 $mJ/cm^2$.

The method of development for eliminating the light-exposed part includes, for example, the methods known in the field of printed circuit forming technique (Circuit Technology, Vol. 4, No. 4 (1989), p. 197; "Printed Circuit Boards", Sentan Gijutsu Shusei, published by Keiei System Kenkyusho (Feb. 10, 1987), p. 308), etc. The development is carried out by contact with an agent (developer) having an appropriate dissolving power. Although said agent is appropriately selected depending on the kind of positive photoresist composition, it is usually selected from alkaline aqueous solutions prepared by dissolving sodium hydroxide, sodium carbonate, quaternary ammonium salt, organic amine or the like in water or organic solvents such as esters, ketones, alcohols, ethers, chlorinated hydrocarbons and the like. The elimination is performed by the method of dipping, showering or the like for a period of from about 5 seconds to about 20 minutes. If necessary, rubbing by means of brush, woven cloth or the like is carried out. Preferably, the developed substrate is thoroughly washed with organic solvent, water or the like.

Step (d) is a step of etching and eliminating the transparent electroconductive layer bared in the gaps between the circuit-form photoresist layer formed in step (c) to obtain a substrate carrying thereon a circuit-form laminate in which the transparent electroconductive layer constitutes an under layer and the photoresist layer constitutes an over layer.

The etching and elimination can easily be achieved by a conventional method. The agent used for the etching may appropriately be selected in accordance with the kind of transparent electroconductive layer. For example, it may be selected from mineral acids, organic acids, the salts thereof, and the like.

Step (e) is a step of subjecting the substrate formed in step (d) to light-exposure through a photomask having a prescribed pattern and thereafter developing the light-exposed portion of the photoresist layer to bare the transparent electroconductive layer constituting the under layer of the laminate, discretely. As occasion demands, the photoresist layer remaining after the development may be subjected to a heat treatment and/or a light irradiation treatment.

The photomask used in this step (e) has light transmitting parts and light screening parts so as to bare the under layer of the transparent electroconductive layer discretely.

In this step (e), exposure to light and development can be carried out in a manner similar to that in step (c). The photoresist layer remaining after the development is subjected to a heat treatment and/or a light irradiation treatment, if necessary. The heat treatment can be carried out at 100°–300° C. for 1–120 minutes, and the light irradiation treatment can be carried out at a light exposure of 50–5,000 $mJ/cm^2$ using a light having a wavelength falling within the ultraviolet or deep ultraviolet region. When the heat treatment and light irradiation treatment are both carried out, the order of the two treatments is not critical. These treatments permit easy elimination of photoresist layer in step (g).

If desired, step (e) may be replaced with the following step (e').

Step (e') is similar to the step (e) mentioned above, provided that the photoresist layer in a part corresponding to the seal part in the production of liquid crystal displays is left uneliminated.

The photomask used in this step is patterned so as to expose the photoresist layer to light, discretely, and screen the other parts and seal parts of the photoresist layer from light.

The exposure and development in this step (e') are as in step (c).

Step (f) is a step of subjecting the resulting substrate to electrodeposition using a thermosetting or photosensitive resin material-containing electro-deposition bath to form colored layers on the transparent electroconductive layer discretely bared in step (e) or (e').

The electrodeposition in this step (f) is carried out in a manner known per se. It includes anionic type and cationic type processes, which are both employable in the present invention. However, anionic type electrodeposition process is preferable because of small influence on the circuit.

The resin materials (binders) contained in an electrodeposition bath include thermosetting resins of maleinated oil type, acrylic type, polyester type, polybutadiene type, polyolefin type and the like. The binder materials are compounded with a colorant having a desired color such as dye, pigment and the like. The electrodeposition bath is usually prepared by dispersing or dissolving the ingredients such as binder, colorant and the like in water and then diluting the resulting dispersion or solution. As the electrodeposition bath, not only those using water but also those using organic solvents are usable.

The substrate obtained through the above-described steps is introduced into the electrodeposition bath. In the case of anionic electrodeposition, a direct current is applied using the electroconductive circuits patterned on the substrate as a positive electrode and a corrosion-resistant electroconductive material such as stainless steel or the like as a counter electrode, whereby an electrodeposition coating film is selectively formed on the discretely bared electroconductive layers of the electroconductive circuits.

The thickness of the electrodeposited coating film can be regulated by changing the conditions of electrodeposition.

Usually, the time period of electro-deposition is from about 1 second to about 3 minutes at 10–300 V. Preferably, the electrodeposited coating film is thoroughly washed after its formation to remove unnecessary materials therefrom. If desired, the electrodeposited coating film may be heat treated at 100°–280° C. for 10–120 minutes in order to enhance its film strength and improve workability of subsequent steps.

The electrodeposition of the present invention may also be carried out by the use of a photosensitive material.

The photosensitive material includes polymers having photosensitivity and function as a binder in the electrodeposition, and compositions of a photosensitive compound and a polymer having function as a binder.

The polymers having photosensitivity and function as a binder are well known. They include polymers obtained by reacting a hydroxyl group-containing monomer having (meth)acryloyl group such as 2-hydroxyethyl acrylate, 2-hydroxyethyl methacrylate and the like with linseed oil, polybutadiene or the like to form a half ester products; the polymer obtained by reacting (meth)acrylic acid or the like with an epoxy group-containing polymer and then reacting therewith a polybasic acid such as dibasic acid, tribasic acid or the like to form ester products, wherein said polybasic acid is preferably a polybasic acid anhydride such as succinic anhydride, trimellitic anhydride or the like from the industrial point of view; polymers obtained by reacting a hydroxyl group-containing monomer such as hydroxyethyl acrylate or the like with a water-soluble polyester resin in the presence of a diisocyanate; and the like.

The polymers having function as a binder includes carboxyl group-containing polymers of maleinated oil type, acrylic type, polyester type, polybutadiene type, polyolefin type, epoxy type and the like.

The photosensitive compound which can be used in combination with the polymer having function as a binder includes polyfunctional (meth)acrylates such as trimethylolpropane tri(meth)acrylate, ditrimethylol-propane hexa(meth)acrylate and the like and oligomers such as urethane (meth)acrylate, polyester (meth)acrylate and the like.

These photosensitive materials preferably have an acid value of from 15 to 150 mg KOH/g and a double bond content (degree of unsaturation) of from 0.1 to 5 moles/kg.

In preparing the electrodeposition bath, it is preferable to use a known photo initiator of benzoin type, anthraquinone type or the like. The amount of the photo initiator preferably falls within the range of from 0.1 to 10% by weight based on the photosensitive material. As the photo initiator, those soluble in water are preferred.

Further, organic solvents of alcohol type, cellosolve type, ester type, hydrocarbon type and the like may also be used for the purpose of improving dilution property, electrophoretic property, spreadability, etc. Further, other known assistants such as antifoaming agent, coating film spreader and the like may also be used as occasion demands.

The electrodeposition bath can be prepared in a manner known per se, for example, by mixing the photosensitive material with a colorant such as dye, pigment or the like and the above-mentioned optional ingredients, and treating the resulting mixture with an organic amine when an anionic type electrodeposition is carried out, and thereafter diluting the resulting mixture with deionized water. As the organic amine, alkylamines such as triethylamine and the like or alkanolamines such as diethanolamine and the like are preferred. The amount of organic amine preferably falls within the range of from 0.3 to 2 moles and more preferably from 0.5 to 1.2 moles per mole of the carboxyl group present in the photosensitive material.

By using the photosensitive material and carrying out an electrodeposition according to the above-described method and conditions, desired discrete color layers can be formed.

The color layers thus obtained is thoroughly washed, and then dehydrated at, for example, 30°–150° C., for 1–30 minutes, and then optionally subjected to the above-mentioned heat treatment to enhance the film strength and improve workability of subsequent steps.

Step (g) of the present invention is a step of eliminating the photoresist layer remaining after the development in step (e) to obtain a substrate having discrete color layers, at the gaps of which the bared substrate surface and the bared transparent electroconductive layer appear.

In this step (g), the elimination is carried out preferably by light exposure followed by development in a manner similar to those in step (c).

When step (e') is selected, step (g) may be replaced with the following step (g').

Step (g') is carried out to eliminate the photoresist layer remaining after the development of step (e'). More specifically speaking, step (g') is carried out to eliminate the remaining portions of the circuit-form laminate constituting photoresist layer, as in the above-mentioned step (g), and if desired, the photoresist layer formed at the seal part.

The elimination of photoresist layer in this step (g') can be achieved by carrying out exposure to light followed by development in a manner similar to those in step (c). If desired, the elimination of photoresist layer may be carried out prior to the heat treatment of the color layers in step (f). The photoresist layer formed at the seal part is preferably eliminated in this step (g').

Through steps (a) to (g) or (g'), there can be formed a substrate having discrete color layers on the electroconductive circuits, at the gaps of which the substrate surface and a part of the transparent electro-conductive circuits appear.

Step (h) is a step of coating the substrate formed in step (g) with a light screening material-containing photosensitive resin composition to form a light screening resin layer. The coating is carried out on whole surface of the substrate including color layers.

The photosensitive resin composition may be any composition so far as the unexposed part thereof can be dissolved and eliminated by development, and includes those containing an acrylic type, urethane type, epoxy type or polyvinyl alcohol type resin, rubber or gelatin, and a photopolymerization initiator such as azo compound, peroxide, halide or the like. Commercially available negative photoresist compositions such as OMR-83 (manufactured by Tokyo Ohka Co., Ltd.), and commercially available photocurable coating materials or inks may also be appropriately used.

Although the light screening material to be mixed into the above-mentioned photosensitive resin composition is not particularly limited, metal oxide black pigments, carbon black, bismuth sulfide, black dyes and the like can be used. An insulating colorant is sometimes preferable depending on the type of LCD.

If desired, the light screening material-containing photosensitive resin composition can further contain a reactive diluent, a reaction initiator, a photosensitizer, an adhesion improver, and organic solvent or water for regulating viscosity, etc.

The coating can be practiced by the method of spin coating, roll coating, screen printing, offset printing, dip coating, or the like, whereby a light screening resin layer can be formed uniformly.

When steps (e') and (g') are selected, the step (h) may be replaced with the following step (h').

Step (h') is carried out in a manner similar to that in step (h), provided that the whole surface of the substrate excluding the seal part is coated with a light screening material-containing photosensitive resin composition to form a light screening resin layer.

Step (i) is a step of exposing the light screening resin layer formed in step (h) or (h') to light emitted from the side opposite to the light screening resin layer-carrying surface of the substrate, followed by development to eliminate the unexposed portion of the light screening resin layer.

In this step (i), the exposure to light can be carried out with lights of various wavelength ranges. Generally speaking, lights of UV region are preferred. As the light source, apparatuses using a super-high pressure mercury lamp, metal halide lamp or the like can be used. Although the conditions of exposure vary depending on the kind of photosensitive resin composition, the light exposure usually falls within the range of from 100 to 4,000 mJ/cm$^2$. In the portion which has been exposed to light, a crosslinking reaction progresses, and the coating film becomes insoluble and cures.

If desired, the exposure to light may be carried out in an atmosphere of nitrogen gas for the purpose of preventing the retardation of polymerization caused by the air oxygen in the process of exposure. Otherwise, it is also possible to carry out the exposure after providing an oxygen-intercepting film composed mainly of polyvinyl alcohol.

In this step (i), the development is carried out for the purpose of dissolving and eliminating the unexposed portion of the light screening resin layer. When the photoresist layer of seal part is not eliminated in step (g'), the photoresist layer of seal part may be developed and eliminated in this step (i) simultaneously. The development can be achieved by contact with an agent (developer) having an appropriate dissolving power. Said agent is selected depending on the kind of the photosensitive resin composition. Usually, it is appropriately selected from alkaline aqueous solutions prepared by dissolving sodium hydroxide, sodium carbonate, quaternary ammonium salts, organic amines or the like in water or organic solvents such as esters, ketones, alcohols, chlorinated hydrocarbons or the like. The elimination can be carried out by the method of dipping or showering for a period of from about 30 seconds to about 5 minutes. Thereafter, the substrate is preferably washed thoroughly with water, an organic solvent or the like.

Preferably, the light screening resin layer occupying the gaps between the discrete color layers is subsequently subjected to a heat treatment at a temperature of 100°–280° C. for a period of 10–120 minutes to improve the film strength.

When steps (e'), (g') and (h') are selected, and the photoresist layer of the seal part is eliminated neither in step (g') nor in step (i), the following step (j) is added to the method of the present invention.

Step (j) is a step of eliminating the photoresist layer of the seal part, and the elimination of photoresist layer may be carried out by any method. For example, it may be carried out by carrying out exposure to light and development in a manner similar to that in step (c).

According to the method of the present invention, there can be obtained a desired substrate having discrete color layers and light screening coating films interlaced between the color layers. Arrangement of the discrete color layers can be determined depending on the kind of LCD, and examples of the arrangement are parallel form, triangular form and mosaic form. In the method of the present invention, a desired arrangement can be realized by appropriately selecting the patterns of photomasks used in step (c) and step (e) or (e'). Using the substrate thus obtained, a color filter can be manufactured.

The color filter can be manufactured in a conventional manner. For example, a color filter can be obtained by forming an overcoat film (protecting film) on the color layers and light-screening coating films formed, and forming a transparent electroconductive film for driving liquid crystal, if necessary, followed by patterning of the electroconductive film into circuits.

Using the color filter which has been manufactured according to the method of the present invention, a liquid crystal display can be manufactured according to known methods.

The method of the present invention is explained in more detail with reference to the following Examples, in which as a comprehensive embodiment, discrete color layers arrayed in parallel and light screening coating films interlaced between the color layers are formed on a glass substrate.

EXAMPLE 1

Figure 1:
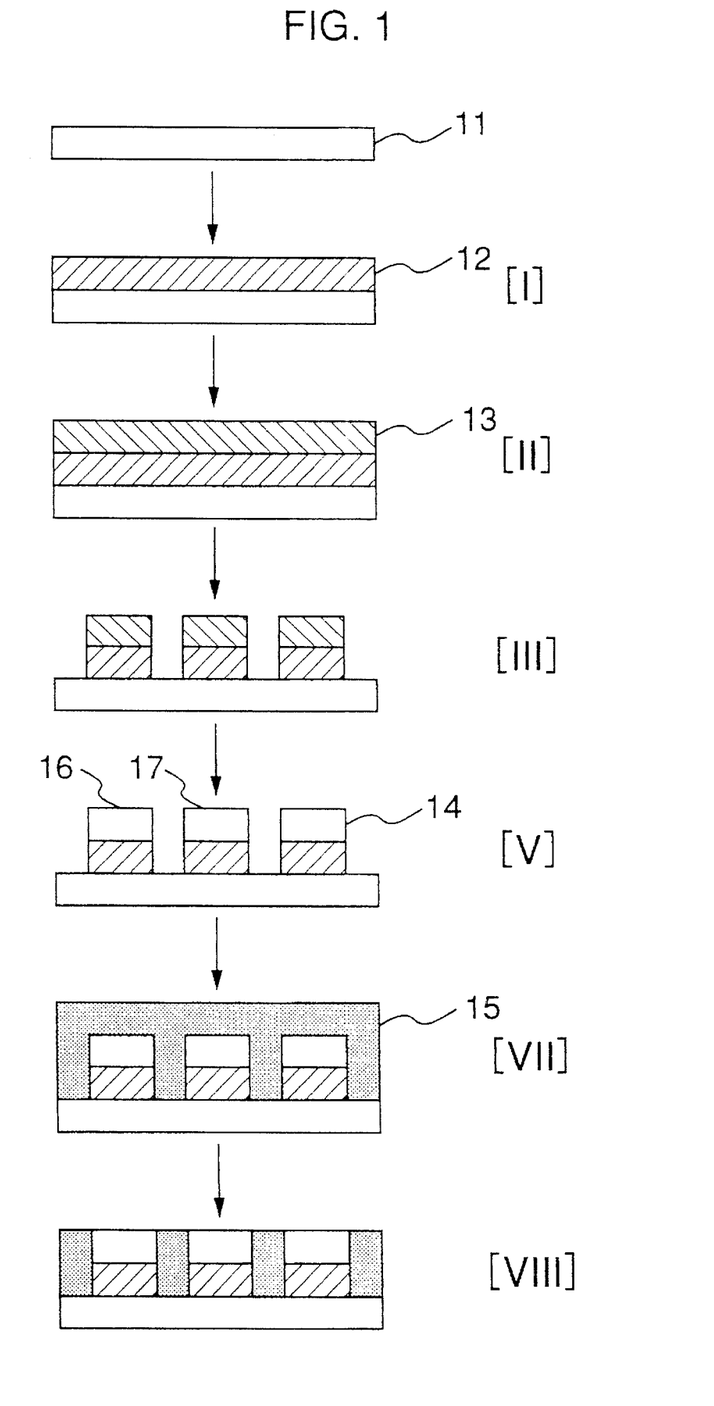
FIG. 1 is a schematic cross-sectional view exemplifying the substrates formed in the steps of the method of the present invention.

In step (a), a transparent electroconductive layer 12 made of ITO (In$_2$O$_3$+SnO$_2$) is formed on a transparent glass substrate 11 having a thickness of 1.1 mm in a conventional manner (FIG. 1, [I]).

In step (b), a positive photoresist composition, FH-2030 (manufactured by Fuji Hant Electronics Co.) is coated onto the transparent electroconductive layer 12 to form a photoresist layer 13 (FIG. 1, [II]).

In step (c), a photomask having a stripe-form pattern in which the width of light screening part is 80 µm and the width of light transmitting part is 20 µm is superposed on the photoresist layer 13, and exposure to light and development are carried out in conventional manners to make the photoresist layer 13 divided into stripes having a width of 80 µm of which gaps each having a width of 20 µm are occupied with bared surface of transparent conductive layer 12.

In step (d), the transparent conductive layer 12 is eliminated by etching in the areas where the surface of transparent conductive layer 12 has been bared in step (c). Through this step (d), a stripe-form laminate in which the under layer is constituted of transparent conductive layer 12 and the over layer is constituted of photoresist layer 13 is formed on the substrate 11 (FIG. 1, [III]).

Figure 2:
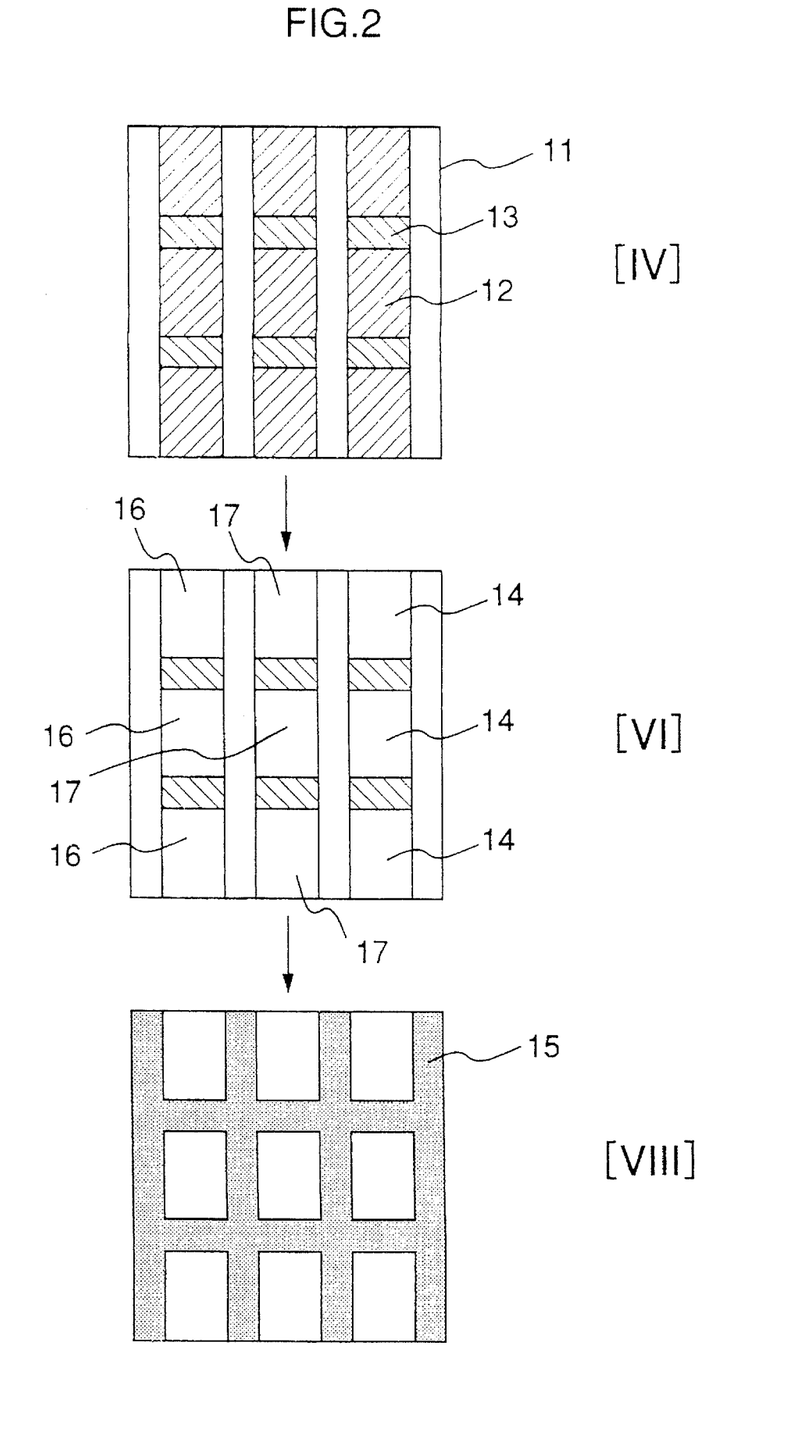
FIG. 2 is a schematic plan view exemplifying the substrates formed in the steps of the method of the present invention.

In step (e), the photoresist layer 13 constituting the over layer of the stripe-form laminate formed through step (d) is developed and eliminated to bare the transparent electroconductive layer discretely by superposing on said laminate a photomask having stripes with a width of light transmitting part of 80 µm and a width of light screening part of 20 µm at a right angle with the stripes of the photomask used in step (c) and carrying out exposure to light followed by development in a conventional manner. By this procedure, the surface of the transparent electroconductive layer is discretely bared, and thus there is obtained a substrate having thereon discretely bared surface of transparent electroconductive layer, gaps being lattice-wise as a whole wherein the gaps of longitudinal direction are occupied with the surface of substrate 11 and the gaps of lateral direction are occupied with photoresist layer 13 (FIG. 2, [IV]).

The photoresist layer 13 constituting the gaps of lateral direction is irradiated with a light having a wavelength of UV region at 1,000 mJ/cm$^2$ and thereafter heat treated at 120° C. for 10 minutes.

In step (f), electrodeposition is carried out according to a conventional manner using the transparent conductive layer 12 on the substrate 11 as one electrode to form color layers 14, 16 and 17 on the discretely bared transparent conductive layer (FIG. 1, [V]).

In step (g), the photoresist layer left in the gaps after the development of step (e) is eliminated.

In the above-mentioned manner, there is formed a substrate having discrete color layers 14, 16 and 17 in which the gaps of longitudinal direction are occupied with bared surface of substrate 11 and the gaps of lateral direction are occupied with bared surface of transparent electroconductive layer 12 (FIG. 2, [VI]).

In step (h), a light screening resin layer 15 is formed by coating whole surface of the substrate with a light screening material-containing negative photoresist composition, a mixture of carbon black and OMR-83 (manufactured by Tokyo Ohka Co., Ltd.), and carrying out a heat treatment at 100° C. for 10 minutes (FIG. 1, [VII]).

In step (i), substrate 11 is subjected to exposure to light from the back side, followed by development in a conventional manner to eliminate the unexposed part of light screening resin layer 15, and the light screening resin layer 15 remaining after the development is cured by a heat treatment at 230° C. for 30 minutes.

In the above-mentioned manner, a substrate having discrete colored layers arrayed in parallel, the lattice-form gaps being filled with light screening coating films with high precision is formed. FIG. 1, [VIII] is a cross-sectional view of the substrate thus formed, and FIG. 2, [VIII] is a plan view thereof.

EXAMPLE 2

Figure 3:
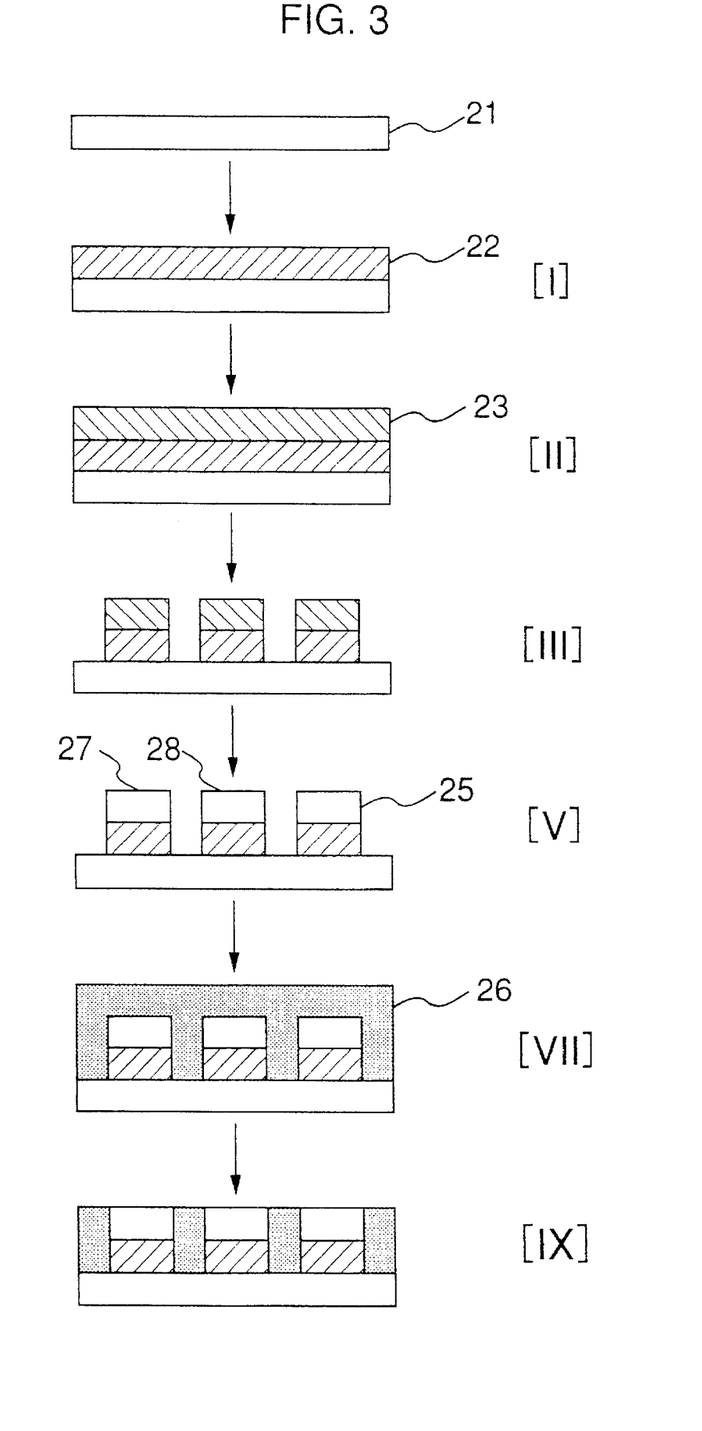
FIG. 3 is a schematic cross-sectional view exemplifying the substrates formed in the steps of the method of the present invention.

In step (a), a transparent electroconductive layer 22 made of ITO ($In_2O_3+SnO_2$) is formed on a transparent glass substrate 21 having a thickness of 1.1 mm (FIG. 3, [I]).

In step (b), a positive photoresist composition, FH-2030 (manufactured by Fuji Hant Electronics Co.) is coated onto the transparent electroconductive layer 22 to form a photoresist layer 23 (FIG. 3, [II]).

In step (c), a photomask having a stripe-form pattern in which the width of light screening part is 80 μm and the width of light transmitting part is 20 μm is superposed on the photoresist layer 23, and exposure to light and development are carried out in conventional manners to make the photoresist layer 23 divided into stripes having a width of 80 μm of which gaps each having a width of 20 μm are occupied with bared surface of transparent conductive layer 22.

In step (d), the transparent conductive layer 22 is eliminated by etching in the areas where the surface of transparent conductive layer 22 has been bared in step (c). Through this step (d), a stripe-form laminate in which the under layer is constituted of transparent conductive layer 22 and the over layer is constituted of photoresist layer 23 is formed on the substrate 21 (FIG. 3, [III]).

Figure 4:
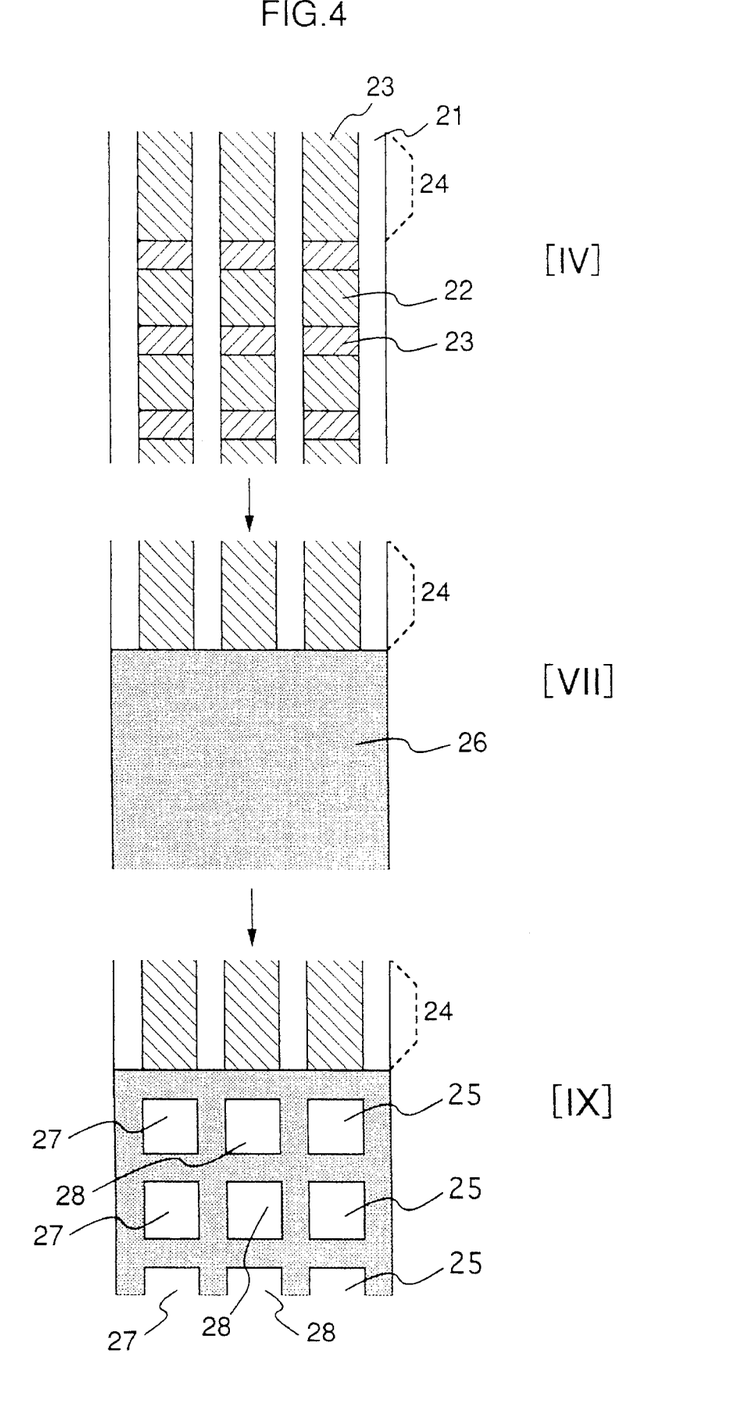
FIG. 4 is a schematic plan view exemplifying the substrates formed in the steps of the method of the present invention.

In step (e'), the photoresist layer 23 constituting the over layer of the stripe-form laminate formed through step (d) is developed and eliminated to bare the transparent electroconductive layer discretely by superposing on said laminate a photomask having stripes with a width of light transmitting part of 80 μm and a width of light screening part of 20 μm, and a light screening seal part 24 of 10 mm width at a right angle with the stripes of the photomask used in step (c) and carrying out exposure to light followed by development in a conventional manner. By this procedure, there is obtained a substrate having discretely bared transparent conductive layer 22 on the surface thereof, the gaps being lattice-wise as a whole, wherein the gaps of longitudinal direction are occupied with the surface of substrate 21, the gaps of lateral direction are occupied with photoresist layer 23, and the seal part 24 is occupied with photoresist layer 23 (FIG. 4, [IV]).

In step (f), electrodeposition is carried out according to a conventional manner using the transparent conductive layer 22 on the substrate 21 as one electrode to form color layers 25, 27 and 28 on the discretely bared transparent electroconductive layer 22 (FIG. 3, [V]).

In step (g'), the photoresist layer 23 remaining after the development of step (e') and dividing the color layers 25, 27 and 28 and the photoresist layer 23 of the seal part are eliminated.

In the above-mentioned manner, there is formed a substrate having discrete color layers 25, 27 and 28, in which the gaps of longitudinal direction are occupied with bared surface of substrate 21 and the gaps of lateral direction are occupied with bared surface of transparent conductive layer 22.

In step (h'), negative resist layer 26 is formed by, coating whole surface of the substrate excluding the seal part 24 with a light screening material-containing negative photoresist composition, a mixture of carbon black and OMR-83 (manufactured by Tokyo Ohka Co.) and carrying out preliminary cure by a heat treatment at 100° C. for 10 minutes (FIG. 3, [VII] and FIG. 4, [VII]).

In step (i), the substrate is subjected to exposure to light from the back side, followed by development in a conventional manner to eliminate the unexposed part of negative resist layer 26, and the negative resist layer 26 left after the development is cured by a heat treatment at 230° C. for 30 minutes.

In the above-mentioned manner, a substrate having discrete color layers, lattice-form gaps being filled with light screening coating films with high precision and a seal part covered with none of these coating films is formed. FIG. 3, [IX] is a cross-sectional view of the substrate thus formed, and FIG. 4, [IX] is a plan view thereof.

According to the method of the present invention, there can be manufactured industrially advantageously a color filter having discrete color layers arrayed on a substrate and light screening coating films interlaced between the color layers, which are both formed with high precision, and if desired a seal part on which none of these coating films is formed. The color filter is well prevented from leakage of light, clear in coloration, and superior in optical properties. Further, a liquid crystal display of high image quality can be manufactured by using said color filter.

What is claimed is:

1. A method for manufacturing a color filter having discrete color layers and light screening coating films interlaced between the color layers, which comprises the steps of:

(a) forming a transparent electroconductive layer on a transparent substrate, (b) coating the transparent electroconductive layer formed in step (a) with a positive photoresist composition to form a photoresist layer, (c) exposing the photoresist layer formed in step (b) to light through a photomask having a prescribed pattern, followed by development to eliminate the light-exposed portion of the photoresist layer, forming the photoresist layer into a circuit-form, (d) subjecting the resulting substrate to etching to eliminate the transparent electroconductive layer bared in the gaps of the circuit-form photoresist layer formed in step (c), obtaining a substrate having thereon a circuit-form laminate consisting of the transparent electroconductive layer as an under layer and the photoresist layer as an over layer, (e) subjecting the substrate formed in step (d) to light-exposure through a photomask having a prescribed pattern, followed by development to bare the transparent electroconductive layer constituting the under layer of the laminate discretely, (f) subjecting the resulting substrate to electrodeposition using a thermosetting or photosensitive resin material-containing electrodeposition bath to form color layers on the transparent electroconductive layer discretely bared in step (e), (g) eliminating the photoresist layer remaining after the development in step (e) to obtain a substrate having the discrete color layers, the gaps thereof being the bared substrate surface and the bared transparent electroconductive layer, (h) coating whole surface of the substrate formed in step (g) with a light screening material-containing photosensitive resin composition to form a light screening resin layer, and (i) exposing the light screening resin layer formed in step (h) to light emitted from the side opposite to the light screening resin layer-carrying surface of the substrate, followed by development to eliminate the unexposed portion of the light screening resin layer.

2. A method according to claim 1, wherein the photoresist layer remaining after the development of step (e) is subjected to a heat treatment and/or a light irradiation treatment.

3. A method according to claim 2, wherein the electrodeposition of step (f) is carried out by using a photosensitive resin material-containing electro-deposition bath.

4. A method according to claim 1, wherein the electrodeposition of step (f) is carried out by using a photosensitive resin material-containing electro-deposition bath.

5. A method according to claim 1, which comprises the following steps (e'), (g') and (h'):

(e') subjecting the substrate formed in step (d) to light-exposure through a photomask having a prescribed pattern, followed by development to bare the transparent electroconductive layer constituting the under layer of the laminate discretely, while leaving uneliminated the photoresist layer in a seal part, (g') eliminating the photoresist layer remaining after the development of step (e') and, if necessary, the photoresist layer at a seal part to obtain a substrate having the discrete color layers, the gaps thereof being the bared substrate surface and the bared transparent electroconductive layer, (h') coating whole surface of the substrate formed in step (g') excluding the seal part with a light screening material-containing photosensitive resin composition to form a light screening resin layer, in place of steps (e), (g) and (h) in claim 1, respectively, and additionally comprises the following step (j):

(j) eliminating the photoresist layer of the seal part, if leaving uneliminated in steps (g') and (i).

6. A method according to claim 5, wherein the photoresist layer remaining after the development of step (e') is subjected to a heat treatment and/or a light irradiation treatment.

7. A method according to claim 6, wherein the electrodeposition of step (f) is carried out by the use of a photosensitive resin material-containing electro-deposition bath.

8. A method according to claim 5, wherein the electrodeposition of step (f) is carried out by the use of a photosensitive resin material-containing electro-deposition bath.

9. A method for manufacturing a liquid crystal display which comprises using the color filter manufactured according to the method of claim 5.

10. A method for manufacturing a liquid crystal display which comprises using the color filter manufactured according to the method of claim 1.

* * * * *